Sept. 1, 1964

J. CONNOR 3,147,032

SOUNDING WEIGHT RETRIEVER

Filed May 10, 1963

INVENTOR.

JAMES CONNOR

BY Harry M. Saragovitz,
Edward J. Kelly,
Herbert Berl &
James W. Colvin

United States Patent Office 3,147,032
Patented Sept. 1, 1964

3,147,032
SOUNDING WEIGHT RETRIEVER
James Connor, 159 Winston Drive, Williamsburg, Va.
Filed May 10, 1963, Ser. No. 279,650
2 Claims. (Cl. 294—74)
(Granted under Title 35, U.S. Code (1952), sec. 266)

The invention described herewith may be manufactured and used by or for the Government for governmental purposes without the payment of any royalty thereon.

This invention relates to a method and to suitable apparatus for retrieving loose or disconnected sounding weights from ship's fuel or water tanks and has for its principal object the provision of simple and efficient apparatus and an easily accomplished method for the purpose.

A further object resides in the provision of simple and economical apparatus for retrieving sounding weights from ship's fuel tanks, which apparatus may be lowered through the tank sounding pipe and easily operated to secure a loose weight and bring the weight out of the upper end of the sounding pipe.

An additional object resides in the provision of apparatus for fishing loose sounding weights from the bottom ends of fuel tank sounding pipes, which apparatus can be attached to an end of a sounding tape such as is regularly used for measuring the quantity of fuel in fuel tanks.

Other objects and advantages will become apparent from a consideration of the following description and the appended claims in conjunction with the accompanying drawing wherein:

Figure 1:
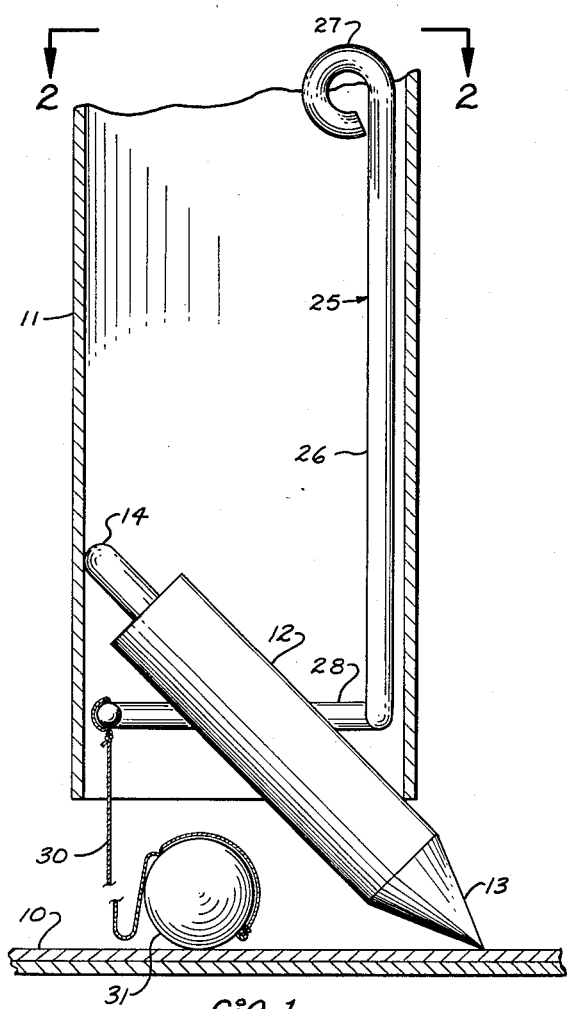
FIG. 1 is a fragmentary longitudinal cross-sectional view of the lower end of a fuel tank sounding pipe showing a loose sounding weight in the lower end of the pipe and retrieving apparatus in accordance with the present invention positioned in the pipe for retrieving the weight.

With continued reference to the drawing, 10 indicates the bottom wall of a ship's tank, the tank having a side, end, and top walls, not illustrated. A sounding pipe 11 extends downwardly through the tank to a location spaced from the bottom wall of the tank a distance sufficient to permit free flow of liquid in the tank into and out of the sounding pipe but not sufficient to permit a sounding weight to pass from the bottom end portion of the pipe into the tank. At its upper end, the sounding pipe 11 extends through the deck, not illustrated, of the ship so that a sounding weight can be lowered through the pipe to measure the quantity of liquid in the tank. Normally, the upper end of the pipe is closed by a removable cover.

A sounding weight is indicated at 12 and is an elongated, cylindrical metal body having one end cone-shaped and brought substantially to a point, as indicated at 13, and having at its other end a longitudinally projecting eye formation 14, the shape being similar to that of an ordinary plumb bob.

In order to take a sounding of the quantity of fuel in a ship's tank, a sounding weight 12 is secured to one end of a measuring tape 15. The tape is a flat, metallic tape of resilient character and suitable indicia are provided on at least one side thereof for measuring the quantity of liquid in a tank. The indicia may be in units of longitudinal measurement such as inches, and a table may be used to convert such a measurement into gallons of liquid in the tank, although if the tape is to be used entirely with tanks of the same shape and dimensions, the indicia may read directly in gallons of liquid.

A shackle 16 is secured to one end of the tape by a ferrule 17 and pin 18 and a hook 19 having a spring tongue 20 is secured to the shackle 16 by a swivel connection 21. The sounding weight 12 is secured to the tape 15 by snapping the eye 14 of the weight into the hook 19. With the weight attached to the tape by the hook 19, the cover at the upper end of the sounding pipe 11 may be removed and the weight lowered into the sounding pipe by the tape until the weight strikes the bottom of the tank. The tape and weight are then removed from the tank and the indication on the tape of the surface of the liquid in the tank provides the measurement of the quantity of liquid in the tank.

For various reasons, the sounding weights 12 become disconnected from the measuring tapes 15, some of such reasons being breaking of the tapes, jamming of the weight under the bottom edge of the pipe, as shown in FIG. 1, and accidental release of the weight from the hook 19.

According to present practice, the method of retrieving a sounding weight from the bottom of a sounding or filling pipe is to send a welder into the tank through a manhole provided for access to the interior of the tank and have the welder cut away enough of the lower end of the sounding pipe to release the weight. The pipe is then repaired by welding but after a few such operations, the operation cannot be repeated. Also, this operation is extremely dangerous as the tank may contain fuel fumes which could cause an explosion if ignited by the welding torch, and is also very expensive. However, the loose weights have to be removed since they interfere with sounding operations and also with filling of the tank if the sounding pipe is also a filling pipe.

Figure 2:
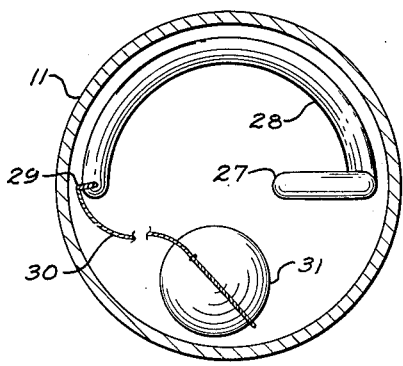
FIG. 2 is a transverse cross-sectional view on a plane indicated by the line 2—2 on FIG. 1.
Figure 3:
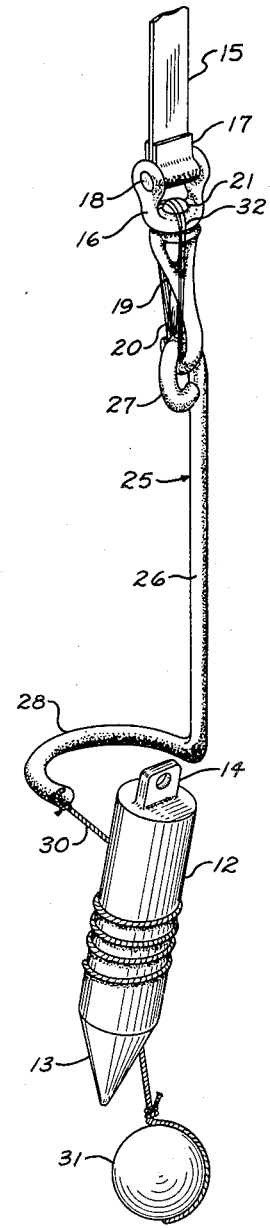
FIG. 3 is a perspective view of the apparatus of the invention with a sounding weight secured to the apparatus for removal from a fuel tank sounding pipe.

It has been found that loose sounding weights can be easily fished from the lower ends of sounding pipes by use of the apparatus and method disclosed in this application. The apparatus comprises a rod-like member, generally indicated 25, including a straight shank portion 26 having an eye formation 27 at one end and a partly circular formation 28 extending perpendicularly from the opposite end. The partly circular formation 28 is substantially semi-circular, as shown in FIG. 2, and has a radius of curvature less than the radius of pipe 11. This formation is provided near its distal end with a transverse aperture 29 and a small line or cord 30 is secured to the formation 28 by being passed through the aperture 29. A weight 31 is secured to the opposite end of the line and this weight is preferably of somewhat spherical or cubical shape. A weight in the form of a metal ball, as shown in the drawing, may be used but it has been found that a large bolt nut or similar object can be used effectively. The member 25 is secured to a tape 15 by connecting the hook 19 to the eye formation 27 of the member 25. The swivel connection 21 is then immobilized by suitable means, such as a wrapping 32 of wire which passes through shackle 16 and eye 27 and also precludes loss of member 25 from tape 15. The member 25, line 30, and weight 31 are then lowered through the pipe 11. The tape is first moved up and down until the formation 28 on the lower end of member 25 passes the upper end of the loose sounding weight 12 and strikes the bottom of the tank. The tape is then pulled up raising the member 25 until the formation 28 is just within the bottom end of the pipe 11, as shown in FIG. 1, and is then twisted to cause the formation 28 to pass several times around the loose weight 12 thereby wrapping the line 30 tightly around the intermediate portion of the weight as shown in FIG. 3. The entire assembly, including the weight 12, may then be drawn upwardly and out of the upper end of pipe 11, the weight 31 maintaining the line wrapped around the loose weight until this weight reaches the upper end of the pipe. The wire binding 32 by immobilizing the swivel connection 21 permits twisting of the tape 15 to cause the member 25 to move around the loose weight 12.

By use of the apparatus and method described above, a loose weight can be retrieved from the lower end of a sounding pipe 11 in a few minutes time, at practically no expense, and without anyone having to enter the fuel tank or cut the lower portion of the sounding pipe.

The above description and the accompanying drawings illustrate an operative form of the invention. It is to be understood, however, that the invention is not limited to the form so described and illustrated, but that the scope thereof is commensurate with the scope of the appended claims.

I claim:

1. Means of retrieving a loose sounding weight from the bottom end of a tank sounding pipe comprising a rod-like member having a shank portion, an eye formation at one end of the shank portion, and a partly circular formation extending perpendicularly from the other end of the shank portion and having a radius of curvature less than the radius of curvature of the sounding pipe through which said member is to be lowered, a line secured at one end to the distal end of said partly circular formation, a weight secured to the other end of said line, and a resilient tape secured at one end to the eye formation of said member by a torsionally rigid connection whereby said member can be lowered through a sounding pipe, rotated in the lower end of said pipe to wrap said line about a loose sounding weight located in the lower end of the sounding pipe to thereby secure the loose weight to said member, and withdrawn from the sounding pipe to retrieve the loose sounding weight.

2. Means for retrieving a loose sounding weight from the bottom end of a tank sounding pipe comprising a member having a shank, an eye formation on one end of said shank and a partly circular formation extending perpendicularly from the other end of said shank and having an aperture near its distal end, a line secured to said partly circular formation by passing through said aperture, a weight connected to the other end of said line, and a tape connected at one end to said eye formation for lowering and raising said member in a tank sounding pipe and for turning said member in said pipe in the vicinity of a loose sounding weight lodged in the pipe to wind said line about the loose weight.

References Cited in the file of this patent

UNITED STATES PATENTS

| | | |
|---|---|---|
| 163,003 | De Leidi | May 11, 1875 |
| 2,072,338 | Kelso | Mar. 2, 1937 |